United States Patent [19]

Finnefrock, Sr.

[11] Patent Number: 4,865,485
[45] Date of Patent: Sep. 12, 1989

[54] SOCKET EXTENSION WITH SAFETY WEDGE

[76] Inventor: James A. Finnefrock, Sr., Rte. 1, Box 187, Corsica, Pa. 15829

[21] Appl. No.: 215,279

[22] Filed: Jul. 5, 1988

[51] Int. Cl.⁴ .............................................. F16B 21/00
[52] U.S. Cl. ................. 403/322; 81/177.85; 403/325; 403/17
[58] Field of Search ................. 403/328, 325, DIG. 6, 403/322, 324, 321, 319, 17; 81/177.5, 177.85

[56] References Cited

U.S. PATENT DOCUMENTS

| | | | |
|---|---|---|---|
| 4,266,453 | 5/1981 | Farley | 81/177.5 |
| 4,502,365 | 3/1985 | Hacker | 81/177.85 |
| 4,537,100 | 8/1985 | Palm | 81/177.5 |
| 4,571,113 | 2/1986 | Coren | 403/322 |
| 4,583,430 | 4/1986 | Farley | 81/177.85 |
| 4,627,761 | 12/1986 | Olson | 403/324 |

Primary Examiner—Andrew V. Kundrat
Assistant Examiner—Carol I. Bordas
Attorney, Agent, or Firm—Leon Gilden

[57] ABSTRACT

A socket extension is set forth with a release mechanism for an included lock ball wherein the release mechanism is positioned on side of the lock ball and an included safety wedge is positioned on the opposite side of the lock ball aligned with the release mechanism. The safety wedge is resiliently biased against the lock ball by a captured spring therebehind and the safety wedge being displaced upon displacement of the release mechanism to disengage said lock ball from an associated socket.

5 Claims, 1 Drawing Sheet

U.S. Patent  Sep. 12, 1989  4,865,485
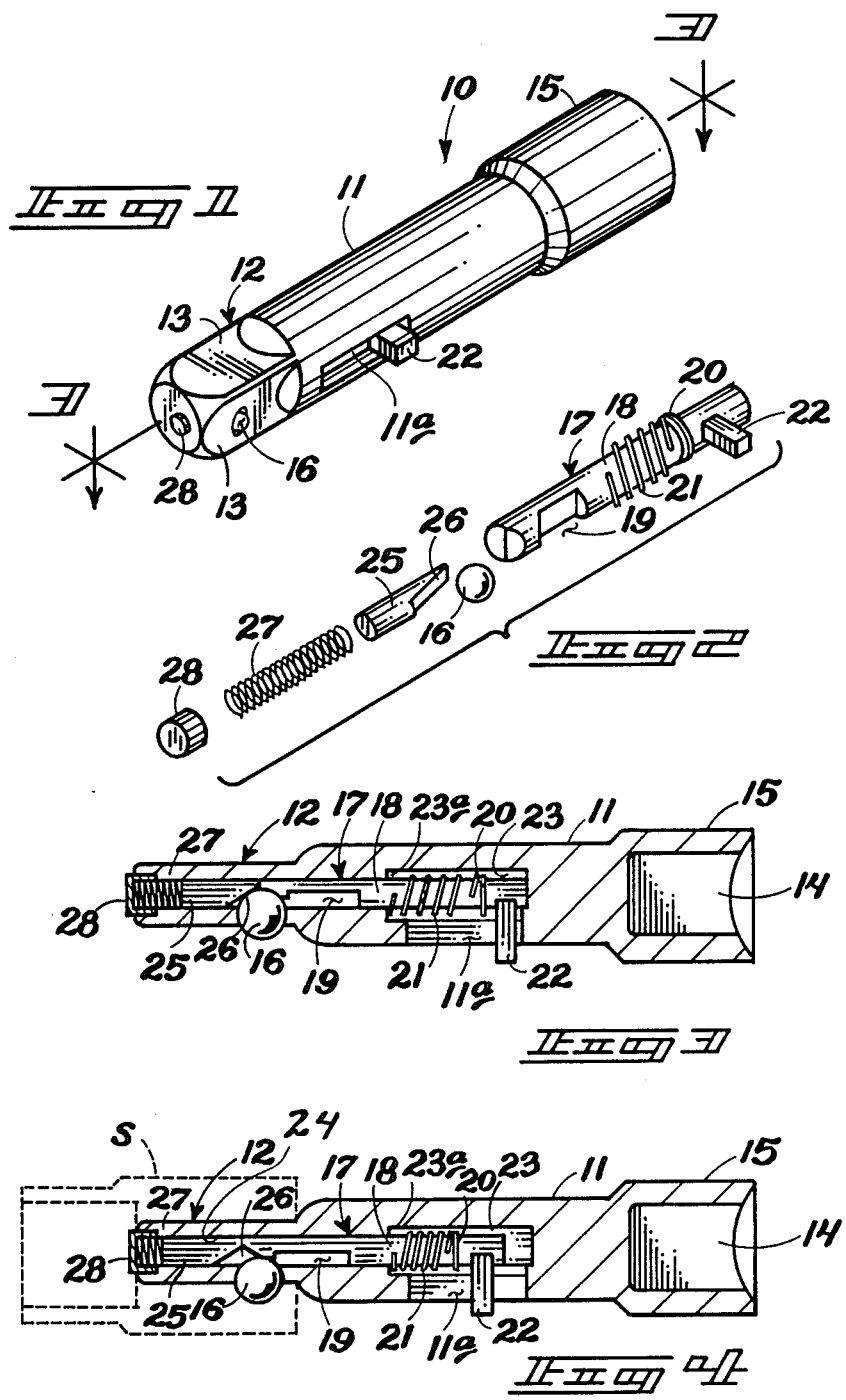

SOCKET EXTENSION WITH SAFETY WEDGE

BACKGROUND OF THE INVENTION

1. Field of the Invention

The field of invention relates to socket extensions, and more particularly pertains to a new and improved socket extension formed with a release mechanism and an included safety wedge wherein the safety wedge is resiliently biased against an included lock ball to maintain said lock ball in a locked position until the safety wedge be displaced to accommodate erosion and wear of the release mechanism and lock ball.

2. Description of the Prior Art

The use of socket extensions and various release mechanisms are well known in the prior art. During the course of repeated wear by mechanics and the like utilizing such devices, a certain amount of wear takes place wherein an initially effective lock ball interengageable with an associated socket over a period of time loses its effectiveness and thereby allows sockets to be inadvertently displaced from an associated extension. This occurrence is highly undesirable causing the loss of time and tools during periods of need. An example of the prior art tool in this category may be found in D'Oporto U.S. Pat. No. 4,211,127 illustrating the use of a conventional release mechanism for an associated safety ball which characteristically does not provide the feature of the instant invention to include a safety mechanism, such as a wedge, to accommodate wear and erosion in use of such a release mechanism.

Farley U.S. Pat. No. 4,266,453 utilizes a separate fastening element positioning a pin through an associated socket and extension to maintain the socket onto the extension. The Farley patent is of interest, but due to the necessity of an additional step during each socket use, it is of a relatively inefficient organization relative to the instant invention.

Palm U.S. Pat. No. 4,537,100 which patent includes a generally orthogonal bore in an extension with a plurality of lock balls mounted for movement between a locked position in which one ball projects from one end of the bore to engage an interior cavity of complementary shape in a socket with a second position to displace the balls and release the socket. The Palm patent is of interest in organization, but one relatively remote from that of the instant invention.

Coren U.S. Pat. No. 4,571,113 sets forth a locking joint for securing an extension and socket together wherein a reciprocating plunger positioned within an extension-type device is reciprocatable to engage and disengage an interior portion of a socket for securement thereof.

Olsen U.S. Pat. No. 4,627,761 sets forth another type of flexible coupling for association of a socket and an extension together in much the manner of the Farley patent noted above.

As such, it may be appreciated that there is a continuing need for a new and improved socket extension with a safety wedge that enables continuous accommodation of wear and erosion in the socket extension to maintain a lock ball in secure association with an associated socket.

SUMMRY OF THE INVENTION

In view of the foregoing disadvantages inherent in the known types of socket extensions now present in the prior art, the present invention provides a socket extension with safety wedge wherein the same may be compactly positioned within a socket extension and continuously accommodate wear and erosion within a release mechanism of the socket extension to insure secure engagement of a lock ball in association with a socket. As such, the general purpose of the present invention, which will be described subsequently in greater detail, is to provide a new and improved socket extension with safety wedge which has all the advantages of the prior art socket extensions and none of the disadvantages.

To attain this, the present invention includes an elongate release mechanism coaxially positioned within a socket extension to enable engagement and disengagement of a lock ball in association with a socket with a safety wedge positioned on the other side of the lock ball with respect to the release mechanism and resiliently biased against the lock ball to continuously accommodate wear and erosion within the lock ball and release mechanism during continuous use to insure maintaining of the lock ball in association with the socket.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved socket extension with safety wedge which has all the advantages of the prior art socket extensions and none of the disadvantages.

It is another object of the present invention to provide a new and improved socket extension with safety wedge which may be easily and efficiently manufactured and marketed.

It is a further object of the present invention to provide a new and improved socket extension with safety wedge which is of a durable and reliable construction.

An even further object of the present invention is to provide a new and improved socket extension with safety wedge which is susceptible of a low cost of manufacture with regard to both materials and labor, and which accordingly is then susceptible of low prices of sale to the consuming public, thereby making such socket extensions with safety wedge economically available to the buying public.

Still yet another object of the present invention is to provide a new and improved socket extension with safety wedge which provides in the apparatuses and methods of the prior art some of the advantages thereof, while simultaneously overcoming some of the disadvantages normally associated therewith.

Still another object of the present invention is to provide a new and improved socket extension with a safety wedge formed therein to continuously bias the safety wedge against an associated lock ball to insure maintaining of the lock ball in locked engagement with a socket and accommodate erosion and wear of the lock ball and release mechanism associated with the socket extension.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an exploded isometric illustration of the release mechanism, lock ball, and safety wedge of the instant invention.

FIG. 3 is an orthographic illustration taken along the lines 3—3 of FIG. 1 in the direction indicated by the arrows.

FIG. 4 is a cross-sectional orthographic view of the instant invention in a release mode with an associated socket.

DESCRIPTION OF THE PREFERRED EMBODIMENT

With reference now to the drawings, and in particular to FIGS. 1 to 4 thereof, a new and improved socket extension with safety lock embodying the principles and concepts of the present invention and generally designated by the reference numeral 10 will be described.

More specifically, it will be noted that the socket extension with safety lock apparatus 10 essentially comprises an elongate axially shank 11 formed with a reduced shank portion 12 formed with orthogonal flats for securement within a typical socket recess of a socket "S". A blind bore 14 is formed at the other end of the shank 11 and formed within an enlarged shank portion 15.

A lock ball 16 is reciprocatingly mounted within a bore orthogonally formed within one of the flats 13 with a diameter somewhat less than the diameter of the lock ball 16. The lock ball 16 is withdrawable into its associated bore upon axial repositioning of the release mechanism 17, as illustrated in FIG. 3. The release mechanism 17 is formed with a release shaft 18 with an axially formed recess 19 extending a distance along the shaft 18 for acceptance of the ball to enable the ball to retract within its associated bore into the recess 19 when the shaft 18 is pressed forwardly by use of the associated shaft handle 22 and is returned to its original position by the return spring 21 cooperating with collar 20 on the shaft 18 and spring seat 23a of the shaft bore 23 formed within the shank portion 11 and reduced shank portion 12. The shaft bore 23 is coaxially directed within the shank and reduced shank portions 11 and 12 of the tool wherein a wedge bore 24 is axially parallel and offset with respect to bore 23 and the axis of the shank 11.

Within the wedge bore 24 is reciprocatingly mounted a wedge member 25 formed with an inclined surface 26 imposing upon the lock ball 16 to maintain the lock ball 16 in an extended position. A wedge spring 27 coacts against the rear face of the wedge 25 to maintain the wedge 25 in this orthogonally aligned orientation relative to the lock ball 16. The biasing of wedge 25 and inclined surface 26 against ball 16 accommodates wear of the ball 16 and thereby constantly forces the wedge 25 upwardly thereagainst ball 16 to maintain the outward orientation of the lock ball 16. A lock cap 28 frictionally or mechanically secured to the mouth of the wedge bore 24 maintains the wedge spring 27 and wedge 25 in cooperation with the lock ball 16, as illustrated. Upon forcing of the shaft handle 22 to a forward or release position, the forward portion of the release shaft 18 engages the forward portion of the wedge 25 and forces the wedge 25 away from the lock ball 16 and compresses the wedge spring 27 to enable withdrawal of lock ball 16 into its respective bore to release an associated socket, as illustrated in FIG. 4.

An elongate slot 11a is coaxially formed through the exterior surface of the shank 11 for reciprocatingly and slidingly accepting the handle 22 therealong wherein the handle is of a substantially parallel pipet configuration to maintain alignment of said handle 22 within the elongate slot 11a.

As to the manner of usage and operation of the instant invention, the same should be apparent from the above description and accordingly, no further discussion relative to the manner of usage and operation of the instant invention shall be presented.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. a socket extension with a safety wedge apparatus comprising;

an elongate coaxially aligned shank formed with a forward portion including a plurality of flats, a first bore orthogonally formed to one of said flats with a spherical lock ball reciprocatingly mounted therein, and a release mechanism resiliently mounted on a first side of said first bore within a second bore coaxially formed in said elongate shank and said forward portion, and a wedge means separate and apart from said release mechanism mounted in a third bore resiliently engaging said lock ball, and wherein said third bore is parallel to and offset from said second bore, and wherein said wedge means includes an elongage wedge proximate a forward end of the wedge means and is formed with an inclined surface wherein said inclined surface is resiliently engageable with said lock ball, and wherein said wedge means includes a remote end spaced from said forward end, and wherein said wedge includes a coil spring mounted in aligned engagement with said wedge means at the remote end, and including a lock cap securing and aligning said spring and wedge within said third bore.

2. A socket extension with a safety wedge apparatus as set forth in claim 1 wherein said release mechanism includes an elongate shank slidably positionable within said second bore and formed with a recess therein for accepting said lock ball when said release mechanism is manually shifted downwardly toward said wedge.

3. A socket extension with a safety wedge apparatus as set forth in claim 2 wherein said release mechanism further includes a handle extending outwardly of said shank and slidably secured within a slot formed in an exterior of said shank with said slot coaxially aligned with said second bore.

4. A socket extension with safety wedge apparatus as set forth in claim 3 wherein the handle 22 is of a generally parallel pipet configuration and maintains alignment of said release mechanism.

5. A socket extension with safety wedge apparatus as set forth in claim 4 wherein said release mechanism further includes a spring biasing said release shaft rearwardly of said lock ball.

* * * * *